June 1, 1943.  W. C. BUTTNER  2,320,339
SAFETY VALVE
Filed Aug. 21, 1939
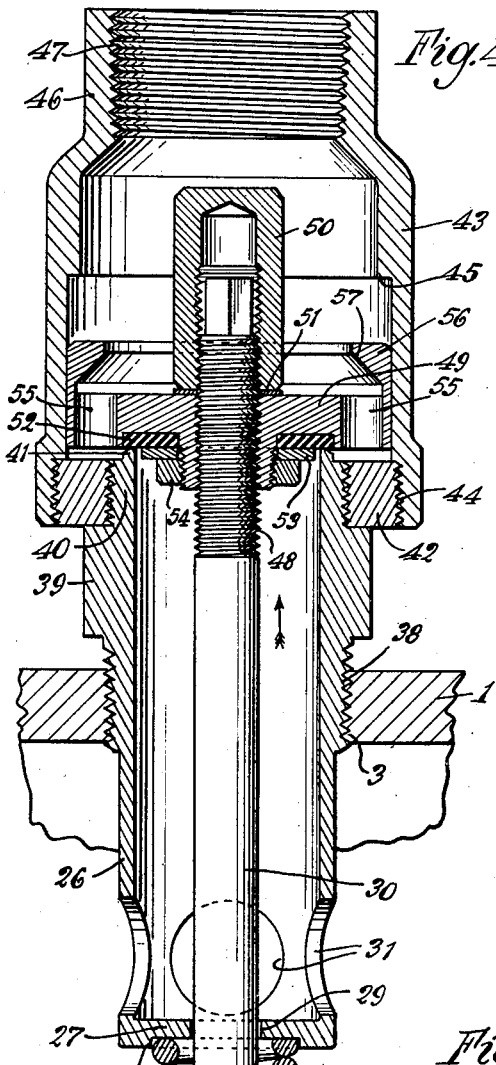
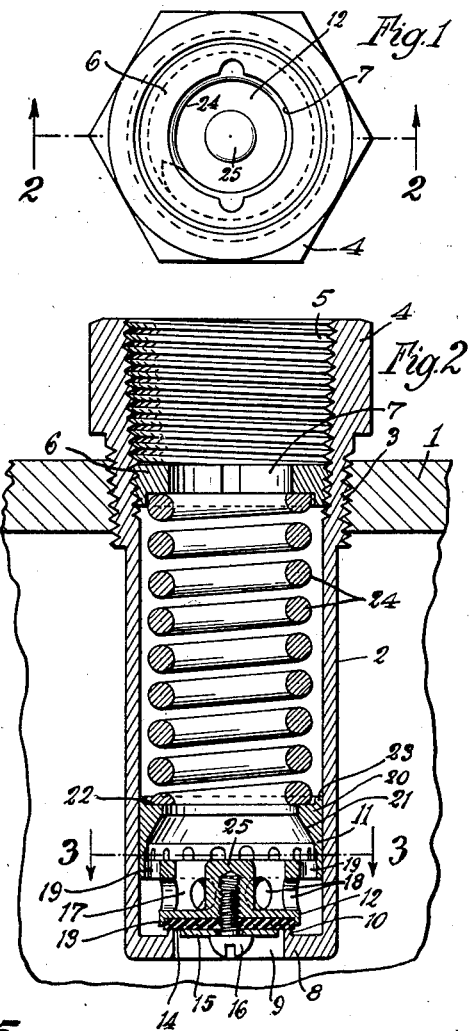
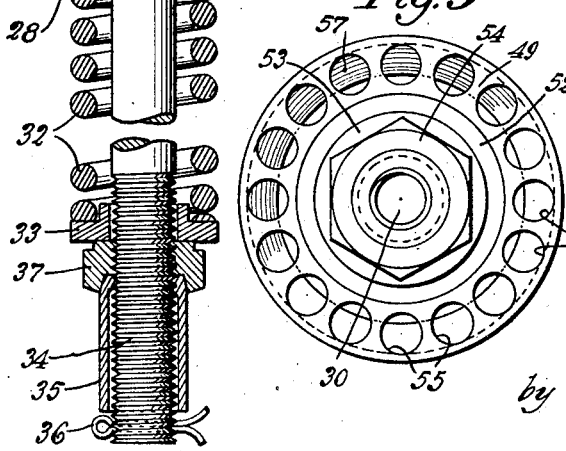
Inventor.
William C. Buttner
by Parker + Carter
Attorneys.

Patented June 1, 1943

2,320,339

UNITED STATES PATENT OFFICE 2,320,339

SAFETY VALVE

William C. Buttner, Winnetka, Ill., assignor to The Bastian-Blessing Company, Chicago, Ill., a corporation of Illinois Application August 21, 1939, Serial No. 291,205

13 Claims. (Cl. 137—53)

This invention relates to a safety or pressure relief valve. It has for one object to provide a valve which will open in response to a predetermined pressure. Another object is to provide such a valve which will not merely open upon the occurrence of a predetermined pressure but will, in effect, "snap" open. A further object is to provide such a valve which will stay fully open and will not fluctuate until the pressure has fallen to that level at which the valve may fully and promptly seat. Another object is to provide a so-called "inside" safety valve in which the valve housing and the valve parts are substantially or wholly within the vessel to which the valve is applied. A further object is to enable the use of a relatively large discharge area in a given standard pipe-size thread opening.

Other objects will appear from time to time throughout the specification and the claims.

The invention is illustrated more or less diagrammatically in the accompanying drawing, wherein:

Figure 1 is an end elevation of the one form of the valve;

Figure 2 is a longitudinal cross section taken at line 2—2 of Figure 1;

Figure 3 is a transverse cross section taken at line 3—3 of Figure 2;

Figure 4 is a longitudinal cross section showing a modified form; and

Figure 5 is a plan view of the valve element of Figure 4 looking in the direction of the arrow of Figure 4.

Like parts are designated by like characters throughout the specification and the drawing.

The valve is ordinarily seated in the wall 1 of a member which may be a tank or any device subject to pressure and with respect to which it is desirable to provide a pressure release or safety valve. As shown in Figure 1, the valve is of the "inside" type, and includes a housing 2 threaded at 3 to engage corresponding threading in the perforation of the member 1. It may be enlarged and given an angular cross section as at 4 by means of which it may be rotated into and out of position. It is interiorly threaded on its open end as at 5 to receive a spring seating member 6, which has one or more perforations 7 formed through it. At its inner end, the housing 2 may be partially closed by a portion 8, perforated as at 9. A raised, inwardly disposed seat 10 is formed about the perforation 9.

11 is a valve member which is of substantially the same size as the inner diameter of the housing 2. At its seating end, it is provided with a reduced portion 12 which carries a peripheral flange or rim 13. On this end and within the rim 13 is a seating member 14 which is held in place by a disc or other retainer 15, which is itself movably held in place by a screw 16. The seating member 14 is seated against the raised valve seat 10 when the valve is closed as shown in Figure 2.

The reduced portion 12 is, as shown, spaced outwardly from the main valve portion 11. It is joined to the valve 11 by an annular section 17, which is perforated as at 18. The outer face of the main valve portion 11 is perforated as at 19. The valve member 11, which is hollow, is provided away from the seating end with an annular enlargement 20, which has an inwardly inclined reaction surface 21. A shoulder 22 may be formed on the valve member 11 and it may be bounded by a flange 23. A spring 24 bears at one end upon the shoulder and at the other end upon the member 6. This latter member may be screwed in and out to adjust the compression of the spring 24. While the valve 12 may be provided with any suitable means for holding the seating portion in place, where the screw 16 is used, an inner enlargement 25 may be provided; and, if provided, it will have a threaded cavity to receive the screw 16.

In the modified form of Figure 4, the valve which is seated in the perforation through the wall 1 is of the so-called "outside" type in which the housing parts that enclose the valve are wholly or largely outside of the container or wall member. In this form, there is a main housing 26 which lies partly inside of and partly outside of the wall 1. At its inner end, it is partially closed by the member 27, and it may have a raised peripheral flange 28. It is provided with a perforation 29 through which a valve stem 30 passes. One or more perforations 31 are formed in the housing 26. A spring 32 is positioned about the stem 30, bears at one end upon the member 27 and at the other end upon the spring button 33, which is adjustably positioned upon the threaded end 34 of the stem 30. A spacer 35 may be used if desired, and a cotter pin 36 prevents displacement of the parts. If desired, a lock nut 37 may also be used.

The housing 26 is threaded as at 38 to engage the threading 3, and may have an enlarged portion of annular cross section 39 by means of which it is screwed into and removed from position. The housing 26 is, also, provided with a reduced exteriorly threaded portion 40 and terminates at its upper end in a raised seat portion 41.

A spacer ring 42 is threaded upon the portion 40 and receives a valve cage or housing 43, which is generally hollow and is threaded as at 44 to engage the exterior threading on the member 42. The housing 43 is provided with a shoulder or stop 45, and may be somewhat reduced at its outer end as at 46, and internally threaded as at 47.

Secured on the outer, and preferably threaded, end 48 of the valve stem 30 is a valve member 49, which is held in place by a nut 50. A washer 51 may be placed between the nut and the valve. On its seating face, the valve member 49 is cut away to receive a seating portion 52, which, as shown in Figure 4, contacts the raised seat 41 when the valve is in the closed position. The seating portion 52 may have applied to it a washer 53 and a nut 54 to hold the parts in place as shown. A suitable number of perforations 55 are formed in the valve also. The valve member 49 is thickened on its inner edge away from its seating face as at 56 to provide an inclined, inwardly disposed reaction surface 57.

Although I have shown an operative form of my device, it will be understood that many changes in the form, shape and arrangement of parts might be made without departing from the spirit of my invention; and I wish that my showing be taken as, in a sense, diagrammatic.

In particular, the openings through the valve member may be of many sizes or shapes, and may be formed by almost any means or in almost any way. Three possible ways are drilling or punching holes or cutting and milling slots. Many others will suggest themselves, and the invention is not limited to any particular size, shape or arrangement of openings or to any particular method of making them. When in the claims the word "perforations" is used, I mean any sort of opening in the valve no matter how formed and no matter of what shape.

The use and operation of this invention are as follows:

The valve in the form shown in Figure 1 is the so-called "inside" type. The valve housing with all of the valve parts is inserted in a suitable opening in a container to which the valve is to be applied; and it and the total valve assembly lying within the container are surrounded by its walls, and protected from outer damage. The valve cannot be broken off.

In the modified form, the valve housing and the valve parts extend beyond the walls of the container and are, therefore, not as fully protected from outside danger as in the form shown in the first figure. However, except for this difference, the operation of the valves of the two forms is substantially the same.

The valves of this invention have an important advantage over those known to the trade because with the construction shown a far more effective area of discharge for a given size pipe thread is possible than has heretofore been known. In one well-known commercial assembly of the present, where an inside valve is inserted in a one and one-half inch pipe thread opening in a tank, there is an approximate area of only .3 of a square inch; while with the design shown herewith, this effective area is increased to approximately .7 of a square inch; thus, more than double the effective area for the same size pipe thread opening.

In another well-known commercial safety valve now on the market, there is a ratio between the area of the actual nozzle or opening below the seat of the safety valve and the cross sectional area of the plunger holding the valve to the seat of approximately one to five. In the new construction shown herewith utilization of a series of perforations or side openings which direct the discharge across the reaction surface makes it possible to obtain a very satisfactory "snap" or "pop" action with the ratio of one to two and one-half, or even less. Thus, the construction of this invention has important practical and operation advantages.

In both of the forms of the safety valve upon the occurrence of a predetermined pressure the spring will yield to permit opening of the valve. When this has occurred and fluid under pressure is discharging through the valve, the valve itself is subjected not only to the direct pressure of fluid from within the tank or container, but there is, in addition, the force created by the thrust of the discharging material upon the inclined surface of the valve member, and fluid discharging under pressure, thus, exerts upon the valve this additional force which, together with the direct load on the valve from within the container, serves first to accomplish satisfactory, complete opening of the valve and, second, to insure that the valve remains adequately open until the pressure has been reduced to such a point that the valve can close promptly and fully. Fluctuation and opening and closing before final closing are, thus, prevented by the construction of the present invention.

The valve of the present invention may embody a wide variety of different valve seats. Thus, the valve seat formed on the member 10 of Figure 2 is flat or relatively flat, and the valve seat formed on the member 41 of Figure 4 is inclined. Either of the seats 10 or 41 might be inclined or flat.

I claim:

1. In combination in a pressure release valve, a hollow housing having an inlet and an outlet, a valve member positioned within said housing said valve member including a forward seat engaging portion of reduced cross-sectional area and an enlarged rearward portion engaging the inner wall of said housing, a valve seat formed within said housing and means for yieldingly holding said valve member seated upon said seat, said valve member being hollow, perforations being formed through a part of said valve member intermediate the reduced seat engaging portion and the enlarged rearward portion thereof and so constructed and arranged that fluid passing between the valve and seat when the valve is in open position is constrained to pass through said apertures into the interior of the hollow valve member, and a reaction surface member formed on the inner surface of the enlarged portion of said valve member and positioned in the path of fluid flowing from said perforations.

2. In combination in a pressure-responsive valve, a housing, an inlet and an outlet opening for said housing, a valve member positioned in said housing and adapted to close one of said openings, a yielding member associated with said valve member and tending normally to hold it seated to close the passage through said housing, said yielding member adapted to yield under predetermined pressure to permit the unseating of said valve member, said valve member comprising a part in contact with the interior of said valve housing, and a seating part adapted to seat over said one of said openings, there being perforations formed through said valve member beyond said seating part, said valve member being provided with a surface providing member against which fluid passing from said perforations impinges, said perforations defining the entire path for fluid moving past said valve member.

3. A safety valve comprising a housing, a valve member therein having a portion snugly fitting the inner wall of the housing and a seat engaging portion of reduced cross-sectional area positioned forwardly of said first mentioned portion, means forming a valve seat within the housing and with which said seat engaging portion of the valve is engaged when the valve is closed, said valve member being hollow and open at the end opposite the seat engaging end thereof, the wall of said valve member being formed and so arranged with apertures intermediate the seat engaging portion and said first mentioned portion that fluid passing between the seat and the valve when the valve is open is constrained to pass through said apertures into the interior of said valve member, and a reaction surface member carried by said valve member rearwardly of said perforations and extending transversely of and disposed in the path of fluid flow through said hollow valve member.

4. A safety valve comprising a valve housing and valve port opening into the housing, a valve member reciprocably mounted in the housing for closing the port against the flow of fluid through the port into the housing, said housing having a continuous wall over that portion covered by the valve member in its reciprocation, a stop means for limiting the valve opening, means for urging the valve to its closed position, said valve having a sliding fit with the wall of the housing, means for conveying within the confines of the housing the fluid from the port to that portion of the housing disposed beyond the valve including passages having predetermined flow characteristics, a reaction surface upon said valve member beyond said passages in the path of flow of fluid from the passages, said valve and said housing wall having a cross sectional area in excess of the flow area of said port.

5. A pressure relief safety valve comprising a body having a walled chamber defining a valve compartment and a valve port, a valve unit mounted in the valve compartment for movement between two positions in one of which the unit closes the port, a passage formed in said valve unit for conducting fluid through the unit which escapes through said port and the walls of said chamber confining said escaped fluid to flow through said passage, spring means for urging the valve unit to said one position, and a wall carried by the valve unit against which said fluid is directed from said passage to impinge to impart a force to the valve member opposing the action of said spring means, the cross sectional area of the valve compartment being less than three times the effective flow area of the valve port.

6. A pressure relief safety valve comprising a body having a cylindrical compartment and a valve port therein, a valve unit mounted in the valve compartment for reciprocable movement between two positions in one of which the unit closes the port, passage means in the unit constituting the sole outlet for fluid escaping through said port, a spring for urging the valve unit to said one position, a wall carried by the valve unit having a face against which fluid flowing from said passage means impinges to impart a force to the valve unit opposing the action of said spring, and a spring retainer for said spring having a passage means therethrough constituting the sole outlet for the discharge of escaped fluid in said valve compartment, the area of said cylindrical compartment as represented by said diameter being less than three times the effective flow area of the valve port.

7. A safety valve for a pressure vessel comprising a body having a valve compartment and a valve port in one wall thereof, a valve unit mounted in the valve compartment for movement between two positions one of which is a valve closing position and the other of which is such that maximum flow of fluid through the port is afforded between the valve and port, spring means urging the valve to the first position, passage means in the valve unit constituting the sole outlet for fluid escaping through the port, said passage means positioned to direct the flow of liquid along the line of valve movement as it leaves the valve unit and a reacting surface carried by the unit in the path of flow of said directed fluid upon which the fluid impinges without hindering the maximum flow of which the port is capable.

8. A safety valve comprising a body having a valve compartment and a valve port through a wall of the compartment, a valve member reciprocably mounted in the valve compartment, a spring for urging the valve to close the port, axially extending passages formed in the valve member constituting an outlet for fluid released by the valve member through the port and a huddling chamber disposed between the valve port and said passages and an inclined wall on the valve member defining a discharge opening centrally of the valve member having converging sides against which escaping fluid passing through said passages impinges to impart to the valve member a force acting equally upon all sides of the valve member.

9. In combination in a pressure release valve, a hollow housing having an inlet and an outlet, a valve member positioned within said housing, a valve seat formed within said housing and means for yieldingly holding said valve member seated upon said seat, said valve member being hollow, perforations being formed through a part of said valve member and positioned to discharge fluid from the valve member in the direction axially of the valve member, and a reaction surface member forming a part of the valve member and being positioned in the path of fluid flowing from said perforations, said perforations comprising the only path for fluid past said valve member.

10. In combination in a pressure release valve, a hollow housing having an inlet and an outlet, a valve member positioned within said housing, a valve seat formed within said housing and means for yieldingly holding said valve member seated upon said seat, said valve member being hollow, perforations opening in the direction of valve movement and formed through a part of said valve member positioned upon the outlet side of the valve, and a reaction surface member forming a part of said valve member and positioned in the path of fluid flowing through said housing and said perforations, said perforations forming the only path for fluid past said valve members.

11. In combination in a pressure release valve, a hollow housing having an inlet and an outlet, a valve member positioned within said housing and in contact with the interior surface thereof, a valve seat formed within said housing and means for yieldingly holding said valve member seated upon said seat, said valve member being hollow and provided with a transverse wall therein, perforations formed through said wall of said valve member and a reaction surface member forming a part of said valve member and positioned to converge the fluid flowing through said housing and through said perforations, said perforations defining the entire fluid path for fluid flowing past said valve member.

12. In combination in a pressure responsive valve, a housing, an inlet and an outlet opening for said housing, a valve member positioned in said housing and adapted to close one of said openings, a yielding member associated with said valve member and tending normally to hold it seated to close the passage through said housing, said yielding member being adapted to yield under predetermined pressure to permit the unseating of said valve member, said valve member comprising a part in contact with the interior of said valve housing, and a seating portion adapted to seat over said one of said openings, there being passages formed longitudinally through a transverse wall of said valve member between said part and said portion, said valve member being provided with a surface member upon the outlet side of the seat and against which fluid passing through said passages impinges, said passages defining the entire fluid path for fluid flowing past said valve member.

13. A valve member for a fluid actuated safety valve comprising a body having a cylindrical outer surface, a port closing means at one end, passages through the wall of the body parallel with said outer surface and terminating in a compartment located centrally of the body, said compartment terminating outwardly in a wall having an inwardly extending reacting surface in the path of flow of fluid from the passages and the outer end of said wall defining a central opening at the other end of the valve constituting the main outlet for escaping fluid.

WILLIAM C. BUTTNER.